(12) United States Patent
Jensen et al.

(10) Patent No.: US 10,467,892 B2
(45) Date of Patent: Nov. 5, 2019

(54) METHOD AND APPARATUS FOR EXCHANGING INFORMATION THROUGH A TACHOMETER SIGNAL

(71) Applicant: CISCO TECHNOLOGY, INC., San Jose, CA (US)

(72) Inventors: Niels-Peder Mosegard Jensen, Sunnyvale, CA (US); Phong Hoang Ho, Cary, NC (US); Robert Vincent Grimes, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 154 days.

(21) Appl. No.: 15/354,456

(22) Filed: Nov. 17, 2016

(65) Prior Publication Data

US 2018/0137747 A1    May 17, 2018

(51) Int. Cl.
G08C 19/22 (2006.01)
H04L 25/49 (2006.01)
G06F 1/20 (2006.01)

(52) U.S. Cl.
CPC .............. *G08C 19/22* (2013.01); *G06F 1/20* (2013.01); *H04L 25/4902* (2013.01)

(58) Field of Classification Search
CPC ........ G08C 19/22; G06F 1/20; H04L 25/4902
USPC ...................................................... 340/10.42
See application file for complete search history.

(56) References Cited

U.S. PATENT DOCUMENTS

| | | | |
|---|---|---|---|
| 5,761,085 A | 6/1998 | Giorgio | |
| 6,068,661 A | 5/2000 | Shari | |
| 6,219,711 B1 | 2/2001 | Chari | |
| 6,545,438 B1 * | 4/2003 | Mays, II | H02P 6/08 318/400.01 |
| 6,725,132 B2 | 4/2004 | Frankel et al. | |
| 6,801,004 B2 | 10/2004 | Frankel et al. | |
| 6,931,306 B2 | 8/2005 | Frankel et al. | |
| 6,950,969 B2 | 9/2005 | Thompson et al. | |
| 6,954,684 B2 | 10/2005 | Frankel et al. | |
| 6,995,532 B2 | 2/2006 | Frankel et al. | |
| 7,117,054 B2 | 10/2006 | Frankel et al. | |
| 7,138,781 B2 | 11/2006 | Murray et al. | |
| 7,151,349 B1 | 12/2006 | Williamson et al. | |
| 7,213,026 B2 | 5/2007 | Evans et al. | |
| 7,281,076 B2 | 10/2007 | Yates et al. | |
| 7,305,316 B2 | 12/2007 | Frankel et al. | |
| 7,612,508 B2 | 11/2009 | Jreij et al. | |
| 7,676,302 B2 | 3/2010 | Frankel et al. | |
| 2003/0015983 A1* | 1/2003 | Montero | G06F 1/206 318/473 |
| 2003/0234625 A1 | 12/2003 | Frankel et al. | |
| 2003/0236594 A1* | 12/2003 | Frankel | G05D 23/1902 700/300 |

(Continued)

*Primary Examiner* — Edwin C Holloway, III
(74) *Attorney, Agent, or Firm* — Cindy Kaplan (57) ABSTRACT

According to one aspect, a method includes obtaining a first signal from a host at an air mover system, the air mover system including an air mover and a tachometer, the tachometer having an associated tachometer signal. The method also includes determining whether the first signal is a request for information associated with the air mover, and providing the information from the air mover system to the host on the associated tachometer signal when it is determined that the first signal is the request for information associated with the air mover.

21 Claims, 4 Drawing Sheets

(56) References Cited

U.S. PATENT DOCUMENTS

| | | | |
|---|---|---|---|
| 2004/0027799 A1* | 2/2004 | King | G06F 1/206 361/679.48 |
| 2004/0230866 A1 | 11/2004 | Yates et al. | |
| 2006/0152891 A1* | 7/2006 | Jreij | H05K 7/20209 361/676 |
| 2007/0028015 A1* | 2/2007 | Wickham | G06F 13/385 710/52 |
| 2007/0200518 A1* | 8/2007 | Verge | H05K 7/20209 318/268 |
| 2008/0093458 A1* | 4/2008 | Pearce | F04D 27/001 235/462.32 |
| 2008/0186672 A1* | 8/2008 | Lanus | G06F 11/3044 361/679.48 |
| 2009/0299544 A1* | 12/2009 | Tanada | G06F 1/206 700/300 |
| 2011/0320043 A1* | 12/2011 | Mikuszewski | G06F 1/20 700/275 |
| 2013/0230411 A1* | 9/2013 | Chang | H05K 7/20727 417/44.1 |

* cited by examiner

METHOD AND APPARATUS FOR EXCHANGING INFORMATION THROUGH A TACHOMETER SIGNAL

TECHNICAL FIELD

The disclosure relates generally to cooling systems for networking and computing equipment. More particularly, the disclosure relates to using a tachometer signal associated with an air mover to transmit manufacturing and other information about the air mover.

BACKGROUND

Networking and computing systems often use air mover systems, e.g., fan systems, for cooling purposes. Often, air mover systems are installed at remote sites or embedded in equipment. As a result, it may be difficult to obtain information relating to an air mover such as the name of a manufacturer of the air mover, a serial number of the air mover, and the like. Typically, to obtain information relating to an air mover, a technician is generally required to be physically present at the location of the air mover.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

In one embodiment, a method includes obtaining a first signal from a host at an air mover system, the air mover system including an air mover and a tachometer, the tachometer having an associated tachometer signal. The method also includes determining whether the first signal is a request for information associated with the air mover, and providing the information from the air mover system to the host on the associated tachometer signal when it is determined that the first signal is the request for information associated with the air mover.

DESCRIPTION

Many host systems within a network include air movers, e.g., fans, and are located in locations which are physically remote from network maintenance personnel. At times, it may be necessary to obtain information relating to air movers in a network. For example, when inventory is taken of equipment associated with a network, it may be necessary to obtain identifying information relating to air movers in the network. To obtain identifying information about an air mover, an individual such as a technician generally must be present at the physical location of an individual host system and its air movers such that the individual may obtain the identifying information. The need for an individual to physically inspect an air mover to obtain identifying information such as the name of a manufacturer and a serial number is inefficient.

The ability of an air mover system to provide or to otherwise transmit identifying information associated with an air mover substantially alleviates a need for an individual to be at the same location as the air mover system to physically look at identifying information on the air mover. In one embodiment, identifying information may be transmitted on a digital tachometer signal from the air mover system to a host when the air mover system receiving a request from the host for the identifying information.

By transmitting information relating to identifying information, e.g., manufacturing information, for an air mover, or inventory information relating to the air mover, on a tachometer status signal, an existing air mover signaling infrastructure may be used to provide the manufacturing information to a host. A pulse width modulation (PWM) signal from a host to an air mover system that includes an air mover may be used to effectively command the air mover system to provide manufacturing information. In one embodiment, upon obtaining a PWM signal from a host that indicates that manufacturing information is desired, an air mover system may effectively transmit manufacturing information pertaining to an air mover in the air mover system to the host using a tachometer status signal.

Figure 1:
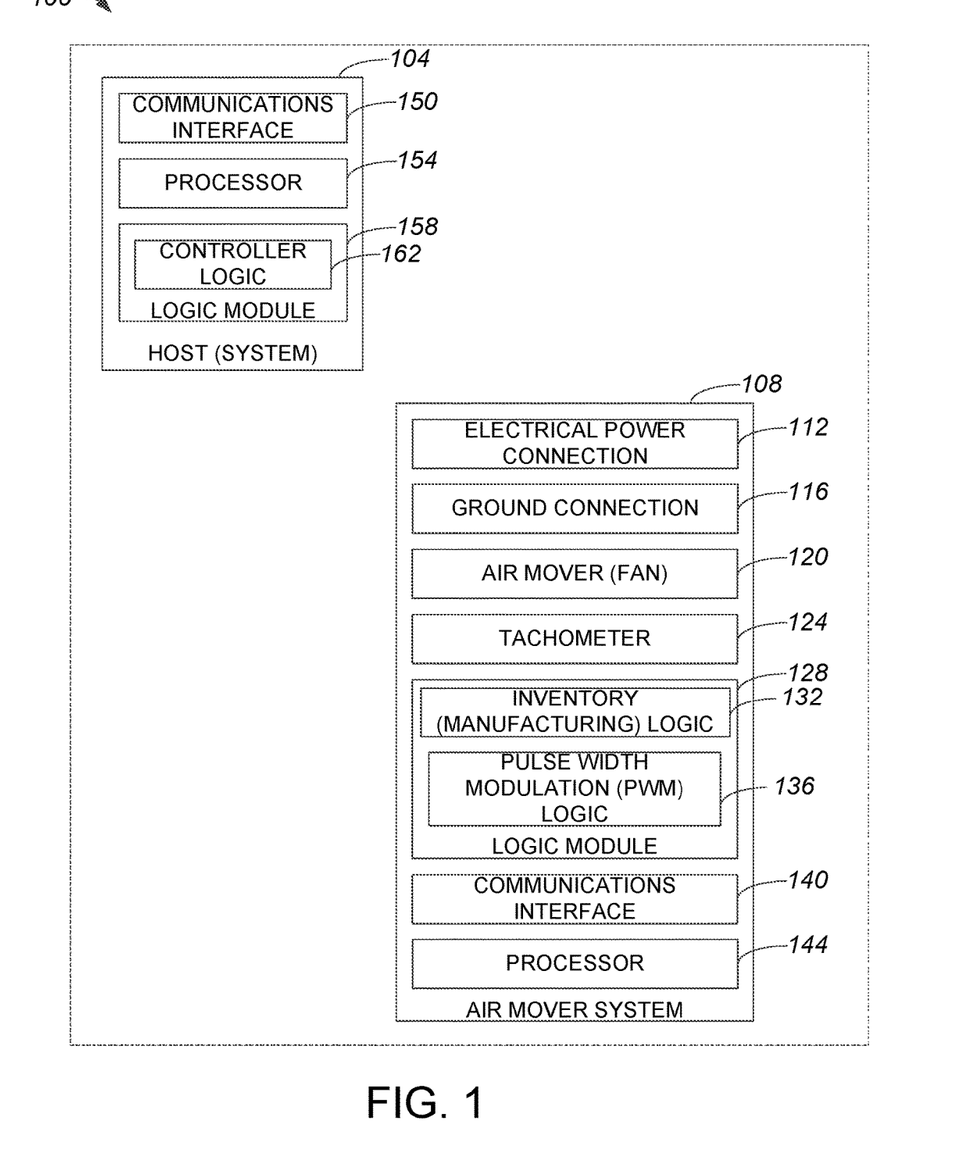
FIG. 1 is a diagrammatic representation of an overall system that includes a host and an air mover system in accordance with an embodiment.

Referring initially to FIG. 1, an overall system that includes a host and an air mover system will be described in accordance with an embodiment. An overall system 100 includes a host 104 and an air mover system 108 which are in communication with each other, e.g., across a network. Air mover system 108 is typically at a remote location with respect to host 104. That is, host 104 and air mover system 108 may or may not be at the same physical location but communicate with each other across either wired or wireless communications links. It should be appreciated, however, that in most instances, host 104 and air mover system 108 are at the same physical location. Host 104 and air mover 108 are typically subsystems of overall system 100.

Host 104, which along with air mover system 108 are part of overall system or apparatus 100, may generally be any suitable computer system, and includes a communications interface 150 which allows host 104 to communicate with air mover system 108 as well as with a network. A technician located in a service center, for example, may communicate over a network with apparatus 100, and host 104 may communicate with air mover system 108 and/or a network. Host 104 also includes a processor 154, which may include any number of microprocessors, and a logic module 158 that may include hardware and/or software logic configured to be executed by processor 154. Logic module 158 includes controller logic 162 configured to provide commands, e.g., instructions, to air mover system 108 through communications interface 150. In one embodiment, controller logic 162 is configured to send or to otherwise provide a digital PWM signal that indicates a desired operational speed of an air mover 120 included in air mover system 108.

Air mover system 108 is generally configured to provide cooling, as for example to networking equipment. In addition to including an air mover 120, e.g., a fan, air mover system 108 includes an electrical power connection 112, a ground connection 116, a tachometer 124, a logic module 138, a communications interface 140, and a processor 144.

As air mover 120 moves, e.g., as air mover 120 rotates or otherwise turns, air mover 120 essentially communicates information relating to its speed to tachometer 124. Through communications interface 140, tachometer 124 may communicate back to host 104 information relating to the speeds at which air mover 120 is moving. That is, tachometer 124 may provide status signals with respect to the operation of air mover 120. The status signals may generally also include a failure status of air mover 120. As will be appreciated by those skilled in the art, when air mover 120 is a fan, tachometer 124 may measure the number of revolutions per minute (rpm) at which the fan is rotating.

Logic module 128 generally includes hardware and/or software logic arranged to be executed by a processor 144, which may include any number of microprocessors. Logic module 128 includes inventory or manufacturing logic 132 and PWM logic 136. Inventory logic 132 is arranged to maintain information relating to air mover 120. Such information may include, but is not limited to including manufacturing information such as a name of a manufacturer of air mover 120, serial number of air mover 120, a model number of air mover 120, a manufacturing date of air mover 120, a manufacturing location of air mover 120, etc. PWM logic 136 is generally arranged to substantially manipulate the pulse width of a PWM control signal obtained from host 104 on communications interface 140. By manipulating the PWM control signal, PWM logic 136 may cause air mover 120 to effectively achieve different speeds while operating under "typical" or standard conditions. PWM logic 136 is also arranged to determine when a PWM control signal obtained from host 104 is "atypical" or non-standard, or indicates that that inventory information relating to air mover 120 is requested by host 104. As will be appreciated by those skilled in the art, typical conditions may be associated with a standard range of operating parameters, whole atypical conditions may be associated with operating parameters that are outside of the standard range. When PWM logic 136 determines that a PWM control signal obtained from host 104 indicates that inventor and/or manufacturing information is desired, PWM logic 136 may cause tachometer 124 to transmit or otherwise provide inventory and/or manufacturing information to host 104.

The format of data provided by air mover system 108 to host 104 in response to a request for inventory information may vary widely. In other words, the format of inventory information effectively transmitted on a signal from tachometer 134 may vary widely. In one embodiment, the format may be substantially standardized such that different vendors of air movers such as air mover 120 may effectively follow the same format. The number of bytes of data used to transmit inventory information may also vary widely. The number of bytes of data used to transmit inventory information, as well as how the bytes may be encoded, may be associated with substantially any protocol, e.g., a universal asynchronous receiver-transmitter (UART) transmission protocol. In one embodiment, approximately sixty-four bytes of data may be used to transmit inventory information, with each bit of the data encoded as high-high-high-low for a "one" and high-low-low-low for a "zero."

Figure 2:
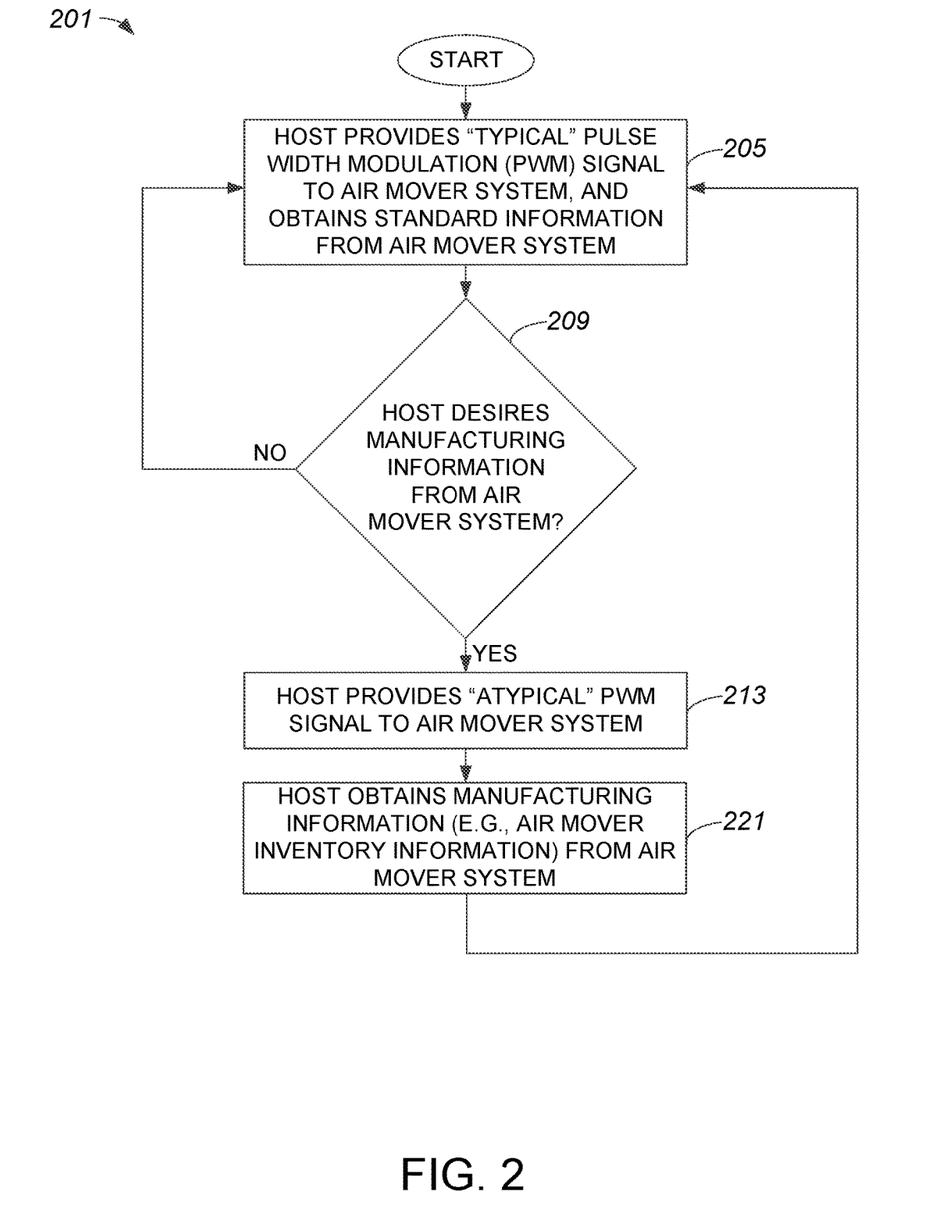
FIG. 2 is a process flow diagram which illustrates one method of a host interacting with an air mover system during the course of operation of the air mover system in accordance with an embodiment.

FIG. 2 is a process flow diagram which illustrates one method of a host interacting with an air mover system during the course of operation of the air mover system in accordance with an embodiment. A method 201 of a host interacting with an air mover system begins at step 205 in which the host provides a typical or "normal" modulation PWM signal value to the air mover system, and obtains standard information from the air mover system. It should be appreciated that a normal PWM signal may generally be any PWM signal which is within a range of standard operating PWM signals for the air mover system. In one embodiment, a standard operating PWM signal may have a value ranging from approximately twenty percent to approximately one hundred percent. The standard information obtained by the host from the air mover system may include, but is not limited to including, the status of a tachometer associated with the air mover system. The status of the tachometer generally includes a current speed of an air mover included in the air mover system, e.g., a rotational speed of a fan. In the described embodiment, the standard information is obtained through a tachometer signal provided by the air mover system, e.g., from a tachometer of the air mover system.

In step 209, a determination is made as to whether the host desires manufacturing information from the air mover system. That is, it is determined whether the host desires information such as manufacturing information relating to an air mover. The manufacturing information may include, but is not limited to including, inventory information such as a manufacturer of the air mover, a serial number of the air mover, a model number of the air mover, and/or a manufacturing date of the air mover. The host may desire manufacturing information from the air mover system for substantially any reason. For example, the host may desire manufacturing information when there is a recall notice on certain air movers, and a technician wishes to verify whether the air mover included in the air mover system is subject to the recall notice. In other words, manufacturing information may be desired to enable a determination of whether an air mover is defective.

If the determination in step 209 is that the host does not desire manufacturing information from the air mover system, process flow returns to step 205 in which the host provides a normal PWM signal to the air mover system, and obtains standard information from the air mover system. Alternatively, if it is determined that the host desires manufacturing information from the air mover system, process flow moves to step 213 in which the host provides an atypical or "out-of-range" PWM signal to the air mover system arranged to indicate that inventory or manufacturing information is desired. The specific PWM signal may generally be a signal known to be, or otherwise configured to be, indicative of a desire for manufacturing information. In one embodiment, substantially any PWM signal that is outside the range of a standard operating PWM signal may be arranged to indicate that manufacturing information is desired. For example, in one embodiment, when the PWM signal is in a range that is less than an approximately twenty percent duty cycle or higher, the PWM signal may be considered to be outside the range of a standard operating PWM signal. In another embodiment, a predefined or predetermined PWM signal may be arranged to indicate that a host is effectively querying an air mover system for manufacturing information.

After the host provides an specific PWM signal, e.g., a PWM signal that is out-of-range or known to indicate that manufacturing information is desired, to the air mover system, the host obtains manufacturing information from the air mover system in step 221. The manufacturing information, which may include inventory information, may be obtained by the host in a tachometer signal from the air mover system. Once the host obtains manufacturing information, process flow returns to step 205 in which the host provides a typical or normal PWM signal, e.g., a PWM signal that is within a standard range, to the air mover system, and obtains standard information from the air mover system.

Figure 3:
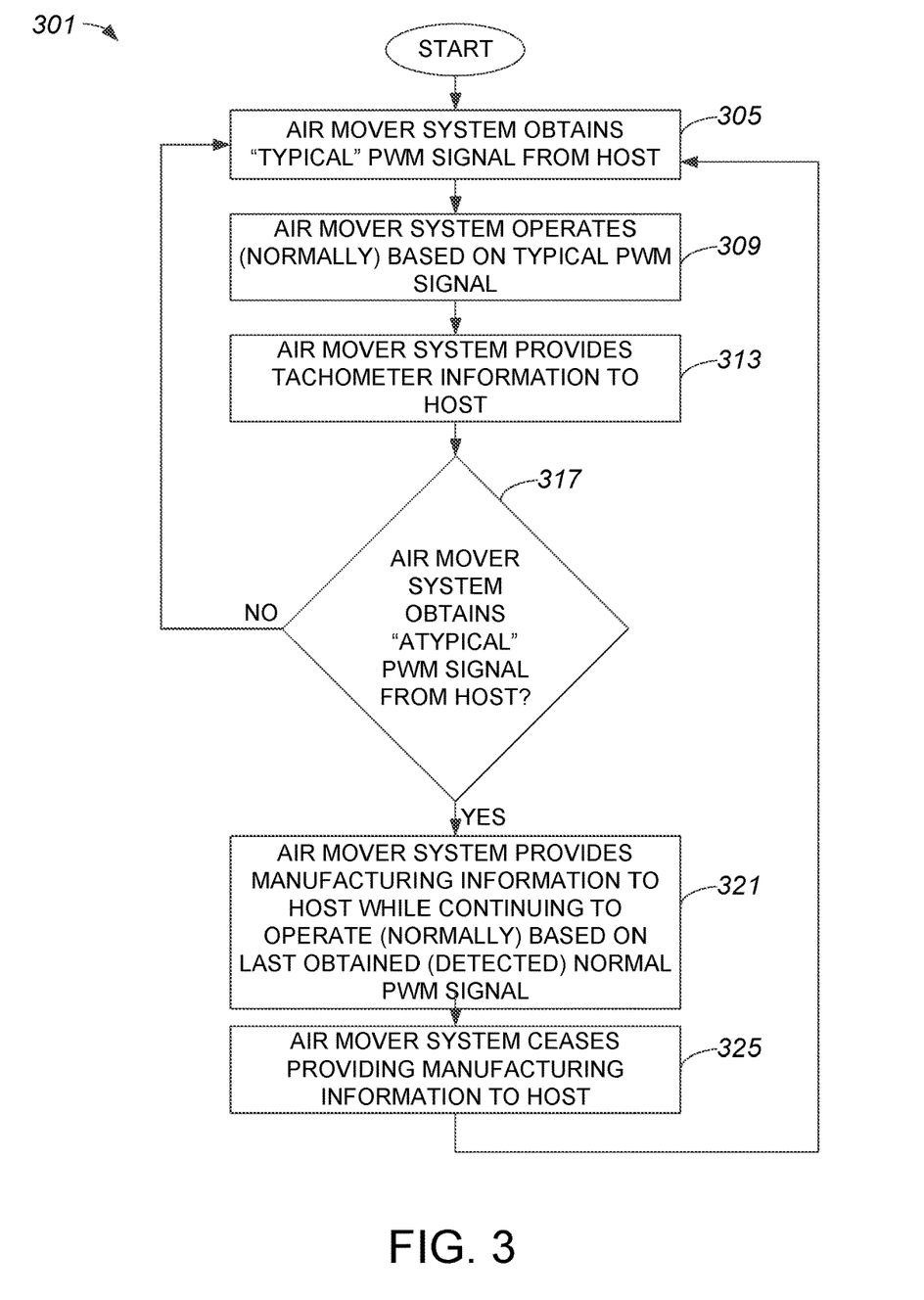
FIG. 3 is a process flow diagram which illustrates one method of an air mover system interacting with a host during the course of operation of the air mover in accordance with an embodiment.

With reference to FIG. 3, one method of an air mover system interacting with a host during the course of operation of the air mover will be described in accordance with an embodiment. A method 301 of an air mover system interacting with a host begins at step 305 in which the air mover system obtains a typical or in range PWM signal from the host. Once the air mover system obtains a typical or in range PWM signal from the host, the air mover system operates based on the normal PWM signal in step 309. In other words, the air mover system causes an air mover, e.g., a fan, to circulate air and, hence, to provide cooling.

In step 313, the air mover system provides standard information to the host. As mentioned above, providing standard information to a host may include providing a tachometer signal, which indicates a speed associated with an air mover of the air mover system, to the host, A determination is made in step 317 as to whether the air mover system has obtained a specific PWM signal, e.g., out-of-range signal, from the host. In the described embodiment, such a determination includes determining whether the air mover system has obtained an indication that the host desires manufacturing information relating to an air mover included in the air mover system. If it is determined in step 317 that the air mover system has not obtained a specific PWM signal from the host, process flow returns to step 305 in which the air mover system obtains a normal PWM signal from the host.

Alternatively, if it is determined in step 317 that the air mover system has obtained a specific PWM signal from the host, the implication is that the host has requested manufacturing information pertaining to an air mover included in the air mover system. Accordingly, in step 321, the air mover system provides manufacturing information to the host while essentially continuing to operate an air mover under substantially normal conditions based on a last, or most recently, obtained or otherwise detected in range PWM signal. Providing the manufacturing information may include transmitting bit streams using a tachometer signal. It should be appreciated that the format of the bit streams or, more generally, the data transmitted using the tachometer signal may vary widely.

From step 321, process flow moves to step 325 in which the air mover ceases providing manufacturing information to the host. In other words, the transmission of manufacturing information from the air mover system to the host on a tachometer sign al is completed at step 325. In one embodiment, an indication of the beginning and the end of manufacturing information transmission from an air mover to a host may be specified using unique signatures in the data pattern. For example, a bit sequence of hexadecimal "BE" may mark the beginning of the data stream and "ED" may mark the end of the data stream. It should be appreciated, however, that the indication of the beginning and the end of manufacturing information transmission may vary widely. After the air mover system ceases providing manufacturing information to the host, process flow returns to step 305 in which the air mover system obtains an in range PWM signal from the host.

Figure 4:
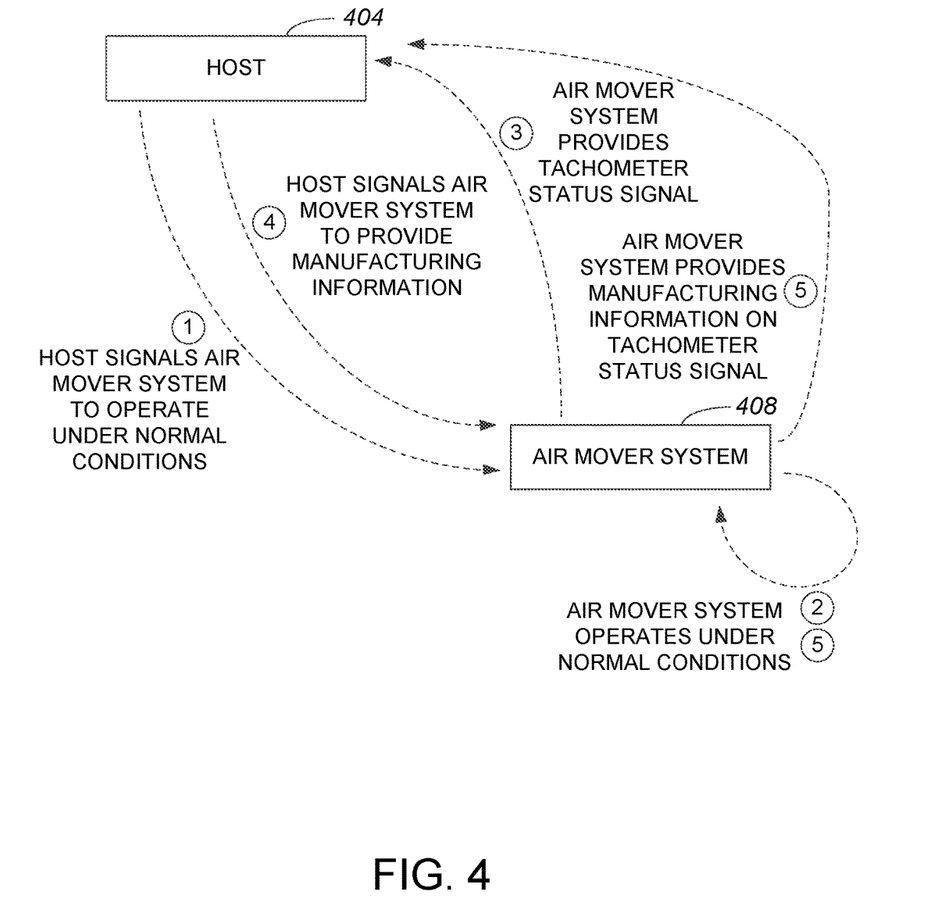
FIG. 4 is a block diagram system which illustrates a host and an air mover system interacting in accordance with an embodiment.

FIG. 4 is a block diagram system which illustrates a host and an air mover system interacting in accordance with an embodiment. A host 404 and an air mover system 408 may be in communication, as for example over a network. At a time t1, host 404 signals air mover system 408 to operate under normal conditions. Signaling air mover system 408 to operate under normal conditions may include causing an air mover of air mover system 408 to operate at a particular speed. At a time t2, air mover system 408 operates under normal conditions, e.g., at a valid operating speed requested or otherwise specified by host 404.

At a time t3, air mover system 408 provides a tachometer status signal to host 404 which is indicative of the speed of an air mover included in air mover system 408. At a time t4, host 404 signals air mover system 408 to provide manufacturing or inventory information relating to an air mover included in air mover system 408. Signaling air mover system 408 to provide manufacturing or inventory information pertaining to an air mover effectively serves as a request for air mover system 408 to provide the manufacturing or inventory information. At a time t5, while continuing to operate under normal conditions, air mover system 408 effectively responds to the request from host 404 for manufacturing information. Therefore, at time t5, while air mover system 408 continues to operate under normal conditions, air mover system 408 provides manufacturing information to host 404 on a tachometer signal.

Although only a few embodiments have been described in this disclosure, it should be understood that the disclosure may be embodied in many other specific forms without departing from the spirit or the scope of the present disclosure. By way of example, in addition to or in lieu of providing manufacturing information using a tachometer signal, other information may be provided using the tachometer system. In other words, information which may be provided or transmitted as part of a tachometer signal is not limited to including a speed associated with an air mover, a failure status relating to the air mover, and manufacturing information related to the air mover. Other information may be substantially encoded in a tachometer signal. The other information may include, but is not limited to including, a temperature associated with an air mover, a vibration associated with an air mover, an electrical current associated with an air mover, and a type of failure associated with an air mover.

While a tachometer signal that provides manufacturing information has been described as being encoded with approximately sixty-four bytes of data, it should be appreciated that how manufacturing data is encoded for transmission to a host may vary widely. Further, although it has been described that a format for transmitting manufacturer data is standardized, the format is not necessarily standardized.

Manufacturing data transmitted from an air mover system to a host using a tachometer signal may generally be encoded for transmission. The encoded data may be decoded upon receipt by a host. In general, however, manufacturing data may instead be embodied in a tachometer signal without being encoded.

A specific PWM signal such as an out-of-range PWM signal obtained or otherwise received from a host has been described as effectively indicating to an air mover system that the air mover system is requested to provide manufacturing information relating to an air mover. As described above, an abnormal PWM signal may be any particular PWM signal which is non-standard, or has a predefined value that is not within a standard PWM operating range. In one embodiment, different abnormal or non-standard PWM signals may be configured to identify a particular type of information, e.g., manufacturing information, relating to an air mover that is requested by a host. For example, a first predefined, non-standard PWM signal may be arranged to indicate that a name of a manufacturer of an air mover is requested while a second predefined, non-standard PWM signal may be arranged to indicate that a serial number of an air mover is requested.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. By way of example, in addition to potentially including a deadline estimate in a packet to facilitate downstream processing, an index of confidence in the deadline estimate may be calculated and either utilized locally or included in the packet. Therefore, the present examples are to be considered as illustrative and not restrictive, and the examples is not to be limited to the details given herein, but may be modified within the scope of the appended claims.

What is claimed is:

1. A method comprising:
   obtaining a first signal from a host at an air mover system, the air mover system including an air mover and a tachometer, the tachometer having an associated tachometer signal, wherein the host and the air mover system are in communication over a network;
   determining whether the first signal is a request for information associated with the air mover;
   encoding the information when it is determined that the first signal is the request for the information;
   providing a first bit sequence from the air mover system to the host, the first bit sequence being arranged to indicate that the encoded information is to be provided from the air mover system to the host when it is determined that the first signal is the request for information associated with the air mover;
   providing the encoded information from the air mover system to the host in the associated tachometer signal after providing the first bit sequence from the air mover system to the host; and
   providing a second bit sequence from the air mover system to the host after providing the encoded information from the air mover system to the host, the second bit sequence being arranged to indicate that the encoded information has been provided from the air mover system to the host.

2. The method of claim 1 wherein the information is manufacturing information, the manufacturing information including at least one selected from a group including a manufacturer name for a manufacturer of the air mover, a model number of the air mover, and a serial number of the air mover, and wherein when the first signal is a first predefined signal, the manufacturing information is the manufacturer name and wherein when the first signal is a second predefined signal, the manufacturing information is the serial number.

3. The method of claim 2 wherein the encoded information is encoded in the associated tachometer signal with sixty-four bytes of data.

4. The method of claim 1 wherein the first signal is a pulse width modulated (PWM) signal and wherein the network includes a wireless communications link between the host and the air mover system.

5. The method of claim 4 further including:
   causing the air mover to operate based on the first signal when it is determined that the first signal is not the request for information associated with the air mover, wherein when it is determined that the first signal is not the request for information associated with the air mover, the first signal is a command arranged to specify a desired speed at which the air mover is to operate.

6. The method of claim 4 wherein determining whether the first signal is the request for information associated with the air mover includes determining whether the first signal has a value outside of a standard PWM range, wherein when it is determined that the first signal has a value outside of the standard PWM range, the first signal is determined to be the request for information associated with the air mover.

7. The method of claim 4 wherein determining whether the first signal is the request for information associated with the air mover includes determining whether the first signal has a predefined value, wherein when it is determined that the first signal has the predefined value, the first signal is determined to be the request for information associated with the air mover.

8. The method of claim 1 further comprising:
   causing the air mover to operate under standard operating conditions while providing the encoded information from the air mover system to the host on the associated tachometer signal.

9. The method of claim 1 wherein the network includes at least one wireless communications link, and wherein the host and the air mover system are in communication through the at least one wireless communications link.

10. Logic encoded in one or more tangible non-transitory, computer-readable media for execution and when executed operable to:
    obtain a first signal from a host at an air mover system, the air mover system including an air mover and a tachometer, the tachometer having an associated tachometer signal, wherein the host and the air mover system are in communication over a network;
    determine whether the first signal is a request for information associated with the air mover;
    encode the information when it is determined that the first signal is the request for the information;
    provide a first bit sequence from the air mover system to the host, the first bit sequence being arranged to indicate that the encoded information is to be provided from the air mover system to the host when it is determined that the first signal is the request for information associated with the air mover;
    provide the encoded information from the air mover system to the host in the associated tachometer signal after the first bit sequence is provided from the air mover system to the host; and provide a second bit sequence from the air mover system to the host after the encoded information is provided from the air mover system to the host, the second bit sequence being arranged to indicate that the encoded information has been provided from the air mover system to the host.

11. The logic of claim 10 wherein the information is manufacturing information, the manufacturing information including at least one selected from a group including a manufacturer name for a manufacturer of the air mover, a model number of the air mover, and a serial number of the air mover, and wherein when the first signal is a first predefined signal, the manufacturing information is the manufacturer name and wherein when the first signal is a second predefined signal, the manufacturing information is the serial number.

12. The logic of claim 11 wherein the encoded information is encoded in the associated tachometer signal as sixty-four bytes of data.

13. The logic of claim 10 wherein the first signal is a pulse width modulated (PWM) signal and wherein the network includes a wireless communications link between the host and the air mover system.

14. The logic of claim 13, wherein the logic is further operable to:
cause the air mover to operate based on the first signal when it is determined that the first signal is not the request for information associated with the air mover, wherein when it is determined that the first signal is not the request for information associated with the air mover, the first signal is a command arranged to specify a desired speed at which the air mover is to operate.

15. The logic of claim 13 wherein the logic operable to determine whether the first signal is the request for information associated with the air mover is operable to determine whether the first signal has a value outside of a standard PWM range, wherein when it is determined that the first signal has a value outside of the standard PWM range, the first signal is determined to be the request for information associated with the air mover.

16. The logic of claim 13 wherein the logic operable to determine whether the first signal is the request for information associated with the air mover is operable to determine whether the first signal has a predefined value, wherein when it is determined that the first signal has the predefined value, the first signal is determined to be the request for information associated with the air mover.

17. The logic of claim 10, wherein the logic is further operable to:
cause the air mover to operate under standard operating conditions while providing the encoded information from the air mover system to the host on the associated tachometer signal.

18. An apparatus comprising:
a processor;
a communications interface, the communications interface being configured to obtain a first signal from a host over a network;
an air mover;
a tachometer, the tachometer being arranged to provide a tachometer signal; and
a logic arrangement, the logic arrangement including program code configured to be executed by the processor, the logic arrangement being arranged to determine when the first signal is a request for information associated with the air mover, the logic arrangement further being arranged to encode the information, to provide a first bit sequence to the host in the tachometer signal to indicate that the encoded information will be provided when it is determined that the first signal is the request for information associated with the air mover, to provide the encoded information to the host in the tachometer signal when it is determined that the first signal is the request for information associated with the air mover, and to provide a second bit sequence to the host in the tachometer signal to indicate that the encoded information has been provided to the host after the encoded information is provided to the host.

19. The apparatus of claim 18 wherein the information is manufacturing information, the manufacturing information including at least one selected from a group including a manufacturer name for a manufacturer of the air mover, a model number of the air mover, and a serial number of the air mover, and wherein when the first signal is a first predefined signal, the manufacturing information is the manufacturer name and wherein when the first signal is a second predefined signal, the manufacturing information is the serial number.

20. The apparatus of claim 18 wherein the first signal is a pulse width modulated (PWM) signal, and wherein the logic arrangement arranged to determine whether the first signal is the request for information associated with the air mover is further arranged to determine whether the first signal has a value outside of a standard PWM range, wherein when it is determined that the first signal has a value outside of the standard PWM range, the first signal is determined to be the request for information associated with the air mover.

21. The apparatus of claim 18 wherein the first signal is a pulse width modulated (PWM) signal, and wherein the logic arrangement arranged to determine whether the first signal is the request for information associated with the air mover is further arranged to determine whether the first signal has a predefined value, wherein when it is determined that the first signal has a predefined value, the first signal is determined to be the request for information associated with the air mover, the information including manufacturing information and a type of failure associated with the air mover.

* * * * *